(12) United States Patent
Hammad et al.

(10) Patent No.: US 12,018,392 B2
(45) Date of Patent: Jun. 25, 2024

(54) METHODS FOR PRODUCING SYNGAS FROM $H_2S$ AND $CO_2$ IN AN ELECTROCHEMICAL CELL

(71) Applicant: Saudi Arabian Oil Company, Dhahran (SA)

(72) Inventors: Ahmad D. Hammad, Dhahran (SA); Bandar A. Fadhel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 363 days.

(21) Appl. No.: 17/567,465

(22) Filed: Jan. 3, 2022

(65) Prior Publication Data

US 2023/0212761 A1 Jul. 6, 2023

(51) Int. Cl.
*C25B 1/23* (2021.01)
*B01D 53/32* (2006.01)
*C25B 1/50* (2021.01)
*C25B 5/00* (2006.01)
*C25B 9/70* (2021.01)
*C25B 15/021* (2021.01)
*H01M 4/48* (2010.01)
*H01M 4/58* (2010.01)
(Continued)

(52) U.S. Cl.
CPC .............. *C25B 1/23* (2021.01); *B01D 53/326* (2013.01); *C25B 1/50* (2021.01); *C25B 5/00* (2013.01); *C25B 9/70* (2021.01); *C25B 15/021* (2021.01); *H01M 4/48* (2013.01); *H01M 4/5815* (2013.01); *H01M 8/0656* (2013.01); *H01M 8/1004* (2013.01); *H01M 16/003* (2013.01)

(58) Field of Classification Search
None
See application file for complete search history.

(56) References Cited

U.S. PATENT DOCUMENTS

| 106,836 | A | 8/1870 | Kuhlmann |
| 665,346 | A | 1/1901 | Reed |

(Continued)

FOREIGN PATENT DOCUMENTS

| CA | 2938299 | 5/2015 |
| CN | 104923234 | 12/2017 |

(Continued)

OTHER PUBLICATIONS

Zhao et al. (J of CO2 Utilization, 37, 2020, 45-54. (Year: 2020).*

(Continued)

*Primary Examiner* — Kevin M Bernatz
(74) *Attorney, Agent, or Firm* — Fish & Richardson P.C.

(57) ABSTRACT

The present application provides systems, apparatuses, and methods for simultaneous processing of tow waster gases, namely $H_2S$ and $CO_2$. In an exemplary process of this disclosure $H_2S$ is supplied to anode side of an electrochemical cell, while $CO_2$ is supplied to the cathode side. As a result, valuable commercial products are produced. In particular, $SO_2$ is harvested from the anode side, while synthesis gas, $CO+H_2$, is harvested from the cathode side. An electric current is also produced, which can be supplied to a local utility grid.

20 Claims, 1 Drawing Sheet

(51) Int. Cl.
*H01M 8/0656* (2016.01)
*H01M 8/1004* (2016.01)
*H01M 16/00* (2006.01)

(56) References Cited

U.S. PATENT DOCUMENTS

| | | |
|---|---|---|
| 701,987 A | 6/1902 | Alz |
| 978,576 A | 12/1910 | Goodell |
| 1,511,001 A | 10/1924 | Padden |
| 1,512,001 A | 10/1924 | Cerny |
| 2,092,316 A | 9/1937 | Lane |
| 2,378,905 A | 6/1945 | Bates |
| 2,614,066 A | 10/1952 | Cornell |
| 2,910,426 A | 10/1959 | Gluesenkamp |
| 3,249,522 A * | 5/1966 | Bolmer ............... C01B 17/34 205/617 |
| 3,288,692 A | 11/1966 | Leduc |
| 3,409,540 A | 11/1968 | Gould et al. |
| 3,427,235 A | 2/1969 | Leduc |
| 3,487,484 A | 1/1970 | Holmes |
| 3,527,834 A | 9/1970 | Kehl et al. |
| 3,533,938 A | 10/1970 | Arnold |
| 3,585,217 A | 6/1971 | Titzenthaler |
| 3,632,497 A | 1/1972 | Leduc |
| 3,702,292 A | 11/1972 | Burich |
| 3,726,789 A | 4/1973 | Kovach |
| 3,755,143 A | 8/1973 | Hosoi et al. |
| 3,856,659 A | 12/1974 | Owen |
| 3,894,059 A | 7/1975 | Selvaratnam |
| 4,064,062 A | 12/1977 | Yurko |
| 4,090,949 A | 5/1978 | Owen et al. |
| 4,119,507 A | 10/1978 | Simmrock et al. |
| 4,134,824 A | 1/1979 | Kamm et al. |
| 4,230,551 A | 10/1980 | Salyer et al. |
| 4,264,435 A | 4/1981 | Read et al. |
| 4,297,203 A | 10/1981 | Ford et al. |
| 4,310,501 A | 1/1982 | Reh et al. |
| 4,329,208 A | 5/1982 | Vayenas et al. |
| 4,332,663 A | 6/1982 | Berneke |
| 4,426,276 A | 1/1984 | Dean et al. |
| 4,434,031 A | 2/1984 | Horowitz et al. |
| 4,522,802 A | 6/1985 | Setzer et al. |
| 4,527,003 A | 7/1985 | Okamoto et al. |
| 4,560,451 A | 12/1985 | Nielsen |
| 4,587,011 A | 5/1986 | Okamoto et al. |
| 4,602,986 A | 7/1986 | Ellis et al. |
| 4,609,441 A | 9/1986 | Frese et al. |
| 4,655,904 A | 4/1987 | Okamoto et al. |
| 4,725,349 A | 2/1988 | Okamoto et al. |
| 4,735,728 A | 4/1988 | Wemhoff |
| 4,761,394 A | 8/1988 | Lauritzen |
| 4,764,315 A | 8/1988 | Brusa |
| 4,786,400 A | 11/1988 | Farnsworth |
| 4,830,728 A | 5/1989 | Herbat et al. |
| 4,855,820 A | 8/1989 | Barbour |
| 4,992,160 A | 2/1991 | Long et al. |
| 5,012,360 A | 4/1991 | Yamauchi et al. |
| 5,091,351 A | 2/1992 | Murakawa et al. |
| 5,108,581 A | 4/1992 | Aldridge |
| 5,344,849 A | 9/1994 | Ayasse |
| 5,518,666 A | 5/1996 | Plester et al. |
| 5,527,436 A | 6/1996 | Cooker et al. |
| 5,601,937 A | 2/1997 | Isenberg |
| 5,624,493 A | 4/1997 | Wagh et al. |
| 5,743,433 A | 4/1998 | Hawkins et al. |
| 5,904,837 A | 5/1999 | Fujiyama |
| 5,906,728 A | 5/1999 | Iaccino et al. |
| 5,944,195 A | 8/1999 | Huang et al. |
| 5,951,850 A | 9/1999 | Ino et al. |
| 5,954,935 A | 9/1999 | Neumeister et al. |
| 6,033,555 A | 3/2000 | Chen et al. |
| 6,084,142 A | 7/2000 | Yao et al. |
| 6,190,533 B1 | 2/2001 | Bradow et al. |
| 6,210,562 B1 | 4/2001 | Xie et al. |
| 6,280,593 B1 | 8/2001 | Wiese et al. |
| 6,293,979 B1 | 9/2001 | Choudhary et al. |
| 6,312,658 B1 | 11/2001 | Hufton et al. |
| 6,319,864 B1 | 11/2001 | Hannigan et al. |
| 6,336,791 B1 | 1/2002 | O'Toole |
| 6,531,515 B2 | 3/2003 | Moore, Jr. et al. |
| 6,656,346 B2 | 12/2003 | Ino et al. |
| 6,743,961 B2 | 6/2004 | Powers |
| 6,849,356 B2 | 2/2005 | Dow et al. |
| 6,852,901 B2 | 2/2005 | Hasenberg et al. |
| 6,979,757 B2 | 12/2005 | Powers |
| 7,019,187 B2 | 3/2006 | Powers |
| 7,045,554 B2 | 5/2006 | Raje et al. |
| 7,132,042 B2 | 11/2006 | Genetti et al. |
| 7,241,401 B2 | 7/2007 | Aasberg-Petersen et al. |
| 7,302,795 B2 | 12/2007 | Vetrovec |
| 7,374,664 B2 | 5/2008 | Powers |
| 7,378,561 B2 | 5/2008 | Olah et al. |
| 7,396,449 B2 | 7/2008 | Powers |
| 7,404,889 B1 | 7/2008 | Powers |
| 7,419,584 B2 | 9/2008 | Stell et al. |
| 7,460,333 B2 | 12/2008 | Akamatsu et al. |
| 7,550,642 B2 | 6/2009 | Powers |
| 7,592,290 B2 | 9/2009 | Hussain et al. |
| 7,642,292 B2 | 1/2010 | Severinsky |
| 7,704,369 B2 | 4/2010 | Olah et al. |
| 7,744,747 B2 | 6/2010 | Halsey |
| 7,842,200 B2 | 11/2010 | Ehrman et al. |
| 7,858,834 B2 | 12/2010 | Powers |
| 7,906,559 B2 | 3/2011 | Olah et al. |
| 7,951,283 B2 | 5/2011 | Stoots et al. |
| 7,972,498 B2 | 7/2011 | Buchanan et al. |
| 7,973,087 B2 | 7/2011 | Kibby et al. |
| 8,075,746 B2 | 12/2011 | Hartvigsen et al. |
| 8,138,380 B2 | 3/2012 | Olah et al. |
| 8,152,973 B2 | 4/2012 | Yamamoto et al. |
| 8,198,338 B2 | 6/2012 | Shulenberger et al. |
| 8,287,716 B2 | 10/2012 | Al-Sadah |
| 8,303,917 B2 | 11/2012 | Miyashiro et al. |
| 8,304,567 B2 | 11/2012 | Kadota et al. |
| 8,592,633 B2 | 11/2013 | Cole et al. |
| 8,628,668 B2 | 1/2014 | Simonson |
| 8,747,698 B2 | 6/2014 | Johanning et al. |
| 8,771,637 B2 | 7/2014 | Wynn et al. |
| 8,816,137 B2 | 8/2014 | Olah et al. |
| 8,845,875 B2 | 9/2014 | Tearney et al. |
| 8,845,878 B2 | 9/2014 | Cole et al. |
| 8,845,940 B2 | 9/2014 | Niven et al. |
| 8,951,333 B2 | 2/2015 | Cabourdin et al. |
| 9,012,345 B2 | 4/2015 | Masel et al. |
| 9,085,497 B2 | 7/2015 | Jennings |
| 9,090,543 B2 | 7/2015 | Schoedel et al. |
| 9,096,806 B2 | 8/2015 | Abba et al. |
| 9,115,070 B2 | 8/2015 | Pazicky et al. |
| 9,175,409 B2 | 11/2015 | Sivasankar et al. |
| 9,221,027 B2 | 12/2015 | Kuppler et al. |
| 9,242,230 B2 | 1/2016 | Moon et al. |
| 9,255,230 B2 | 2/2016 | Shafi et al. |
| 9,260,366 B2 | 2/2016 | Verhaak et al. |
| 9,273,020 B2 | 3/2016 | Schjodt et al. |
| 9,279,088 B2 | 3/2016 | Shafi et al. |
| 9,284,497 B2 | 3/2016 | Bourane et al. |
| 9,284,502 B2 | 3/2016 | Bourane et al. |
| 9,296,961 B2 | 3/2016 | Shafi et al. |
| 9,303,323 B2 | 4/2016 | DiMascio et al. |
| 9,312,454 B2 | 4/2016 | Itoh et al. |
| 9,328,035 B1 | 5/2016 | Kuhn et al. |
| 9,435,404 B2 | 9/2016 | Goleski et al. |
| 9,555,367 B2 | 1/2017 | Masel et al. |
| 9,559,375 B2 | 1/2017 | Savinall et al. |
| 9,618,264 B1 | 4/2017 | Berdut-Teruel |
| 9,631,284 B2 | 4/2017 | Braun et al. |
| 9,634,343 B2 | 4/2017 | Munier et al. |
| 9,675,979 B2 | 6/2017 | Hassell |
| 9,752,080 B2 | 9/2017 | Christensen et al. |
| 9,827,517 B2 | 11/2017 | Vecitis et al. |
| 9,884,313 B2 | 2/2018 | Shen et al. |
| 9,951,430 B2 | 4/2018 | Souentie et al. |
| 9,963,392 B2 | 5/2018 | Deo et al. |
| 9,970,804 B2 | 5/2018 | Khousa et al. |

(56) References Cited

U.S. PATENT DOCUMENTS

| | | | |
|---|---|---|---|
| 9,973,141 B2 | 5/2018 | Hammad et al. | |
| 10,179,326 B2 | 1/2019 | Basset et al. | |
| 10,179,733 B2 | 1/2019 | Becker et al. | |
| 10,252,243 B2 | 4/2019 | Fadhel et al. | |
| 10,252,909 B2 | 4/2019 | Lofberg et al. | |
| 10,329,676 B2 | 6/2019 | Kaczur et al. | |
| 10,357,759 B2 | 7/2019 | D'Souza et al. | |
| 10,422,754 B2 | 9/2019 | Al Hosani et al. | |
| 10,676,833 B2 | 6/2020 | Dismukes et al. | |
| 11,001,549 B1 | 5/2021 | Hammad et al. | |
| 11,050,076 B1 | 6/2021 | Wang et al. | |
| 11,059,720 B1 | 7/2021 | Fadhel et al. | |
| 2002/0156137 A1 | 10/2002 | Zhou et al. | |
| 2003/0215696 A1* | 11/2003 | Chuang | H01M 8/0606 |
| | | | 429/480 |
| 2005/0203194 A1 | 9/2005 | Botes et al. | |
| 2005/0211603 A1 | 9/2005 | Guillaume et al. | |
| 2005/0241825 A1 | 11/2005 | Burris, II et al. | |
| 2006/0157239 A1 | 7/2006 | Ramos et al. | |
| 2006/0171065 A1 | 8/2006 | Akamatsu et al. | |
| 2008/0011644 A1 | 1/2008 | Dean | |
| 2008/0011645 A1 | 1/2008 | Dean | |
| 2008/0015267 A1 | 1/2008 | Lu et al. | |
| 2008/0083648 A1 | 4/2008 | Bishop et al. | |
| 2008/0194900 A1 | 8/2008 | Bhirud | |
| 2008/0277314 A1 | 11/2008 | Halsey | |
| 2008/0283445 A1 | 11/2008 | Powers | |
| 2009/0050523 A1 | 2/2009 | Halsey | |
| 2010/0089795 A1 | 4/2010 | Fujiyama et al. | |
| 2010/0137458 A1 | 6/2010 | Erling | |
| 2010/0261070 A1 | 10/2010 | Keshavarz et al. | |
| 2011/0021858 A1 | 1/2011 | Ramachandran et al. | |
| 2011/0083996 A1 | 4/2011 | Shafi et al. | |
| 2011/0132770 A1 | 6/2011 | Sala et al. | |
| 2011/0247500 A1 | 10/2011 | Akhras et al. | |
| 2011/0253373 A1 | 10/2011 | Kumar et al. | |
| 2012/0077068 A1 | 3/2012 | Wang | |
| 2012/0234694 A1 | 9/2012 | Vecitis et al. | |
| 2012/0292196 A1 | 11/2012 | Albrecht et al. | |
| 2013/0129610 A1 | 5/2013 | Kale | |
| 2013/0134049 A1 | 5/2013 | Teamey et al. | |
| 2013/0220884 A1 | 8/2013 | Bourane et al. | |
| 2013/0233766 A1 | 9/2013 | Shafi et al. | |
| 2013/0248419 A1 | 9/2013 | Abba | |
| 2014/0194539 A1* | 7/2014 | Hammad | C25B 11/061 |
| | | | 422/186.04 |
| 2014/0272734 A1 | 9/2014 | Braun et al. | |
| 2015/0048777 A1 | 2/2015 | Goldstein | |
| 2015/0057458 A1 | 2/2015 | Schjodt et al. | |
| 2015/0225295 A1 | 8/2015 | Mcandlish et al. | |
| 2015/0337445 A1 | 11/2015 | Hasegawa et al. | |
| 2015/0343416 A1 | 12/2015 | Fadhel et al. | |
| 2016/0002035 A1 | 1/2016 | Ralston et al. | |
| 2016/0038919 A1 | 2/2016 | Landau et al. | |
| 2016/0129423 A1 | 5/2016 | Basset et al. | |
| 2016/0264886 A1 | 9/2016 | Davydov | |
| 2016/0305029 A1* | 10/2016 | Souentie | C25B 5/00 |
| 2016/0312369 A1 | 10/2016 | Moussallem et al. | |
| 2016/0320769 A1 | 11/2016 | Deffenbaugh et al. | |
| 2016/0333487 A1 | 11/2016 | Rodriguez | |
| 2016/0351916 A1 | 12/2016 | Birss et al. | |
| 2017/0050845 A1 | 2/2017 | Lofberg et al. | |
| 2017/0292197 A1 | 10/2017 | Lei et al. | |
| 2017/0314148 A1 | 11/2017 | Rondinone et al. | |
| 2018/0023202 A1 | 1/2018 | Krause et al. | |
| 2018/0057423 A1 | 3/2018 | Kimura et al. | |
| 2019/0011372 A1 | 1/2019 | Cunningham et al. | |
| 2019/0032228 A1 | 1/2019 | Krause et al. | |
| 2019/0194074 A1 | 6/2019 | Amr et al. | |
| 2019/0308183 A1 | 10/2019 | Agblevor et al. | |
| 2020/0290935 A1 | 9/2020 | Goode et al. | |
| 2021/0114943 A1 | 4/2021 | Amr et al. | |
| 2021/0171430 A1 | 6/2021 | Hammad et al. | |
| 2021/0179526 A1 | 6/2021 | Hammad et al. | |
| 2021/0229072 A1 | 7/2021 | Alsolami et al. | |
| 2021/0229074 A1 | 7/2021 | Alsolami et al. | |
| 2021/0268480 A1 | 9/2021 | Alsolami | |
| 2021/0387929 A1 | 12/2021 | Fadhel et al. | |
| 2021/0395903 A1 | 12/2021 | Hammad et al. | |
| 2021/0399323 A1 | 12/2021 | Hammad et al. | |
| 2022/0205113 A1* | 6/2022 | Lupton | C25B 11/069 |

FOREIGN PATENT DOCUMENTS

| | | | |
|---|---|---|---|
| CN | 106591875 | 3/2019 | |
| DE | 102006020843 | 11/2007 | |
| EP | 0389294 | 9/1990 | |
| EP | 1808920 | 7/2007 | |
| EP | 2673083 | 12/2013 | |
| GB | 707987 | 4/1954 | |
| JP | H 02137782 | 5/1990 | |
| JP | 5861492 | 2/2016 | |
| WO | WO 2000009633 | 2/2000 | |
| WO | WO 2003062141 | 7/2003 | |
| WO | WO 2009073436 | 6/2009 | |
| WO | WO 2010009077 | 1/2010 | |
| WO | WO 2010009082 | 1/2010 | |
| WO | WO-2010009082 A1 * | 1/2010 | C10G 45/18 |
| WO | WO 2010009089 | 1/2010 | |
| WO | WO-2010009089 A2 * | 1/2010 | B01J 35/1061 |
| WO | WO 2010143783 | 12/2010 | |
| WO | WO 2015128045 | 9/2013 | |
| WO | WO 2014160168 | 10/2014 | |
| WO | WO 2015139136 | 9/2015 | |
| WO | WO 2015183200 | 12/2015 | |
| WO | WO 2016207892 | 12/2016 | |
| WO | WO 2017004705 | 1/2017 | |
| WO | WO 2017130081 | 8/2017 | |
| WO | WO 2018107450 | 6/2018 | |
| WO | WO 2019043598 | 3/2019 | |
| WO | WO 2019112555 | 6/2019 | |

OTHER PUBLICATIONS

Barbieri et al. (Inv. Disc. I, 2021, 100001). (Year: 2021).*
U.S. Appl. No. 16/899,254, Fadhel et al., filed Jun. 11, 2020.
U.S. Appl. No. 17/140,242, Fadhel et al., filed Jan. 4, 2021.
U.S. Appl. No. 17/450,406, Birss et al., filed Dec. 1, 2016.
U.S. Appl. No. 17/450,416, Hammad et al., filed Oct. 8, 2021.
U.S. Appl. No. 17/497,521, Hammad et al., filed Oct. 8, 2021.
U.S. Appl. No. 17/497,556, Hammad et al., filed Oct. 8, 2021.
"Hydrogen and Oxygen production via electrolysis powered by renewable energies to reduce environmental footprint of a WWTP.," Greenlysis, www.life-greenlysis.eu 2010-2012, 16 pages.
Aguilar et al., "A solid oxide fuel cell operating on hydrogen sulfide (H2S) and sulfur-containing fuels," Journal of Power Sources, 2004, 135: 17-24.
Albrecht et al., "Unexpectedly efficient CO2 hydrogenation to higher hydrocarbons over non-doped Fe2O3," Applied Catalysis B: Environmental 204: 119-126, May 2017, 8 pages.
Beurden, "On the catalytic aspects of steam-methane reforming," Energy Research Centre of the Netherlands (ECN), Technical Report I-04-003, Dec. 2004, 27 pages.
Bhuiyan, "Metathesis of Butene to Produce Propylene over Mesoporous Tungsten Oxide Catalyst: Synthesis, Characterization and Kinetic Modeling," A Thesis Presented to the Deanship of Graduate Studies, King Fahd University of Petroleum and Minerals, in Partial Fulfillment of the Requirements for the Degree of Master of Science in Chemical Engineering, Jun. 2013, 188 pages.
Bidrawn et al., "Efficient Reduction of CO2 in a Solid Oxide Electrolyzer," Electrochemical and Solid-State Letters, II, B167-B170, reprinted from Penn Libraries, 2008, 6 pages.
Catalyst Preparation: Science and Engineering, Regalbuto, CRC Press, Taylor & Francis Group, 2007, 491 pages.
Chew et al., "Effect of nitrogen doping on the reducibility, activity and selectivity of carbon nanotube-supported iron catalysts applied in CO2 hydrogenation," Applied Catalysis A: General 482: 163-170, Jul. 2014, 29 pages.
Choi et al., "Carbon dioxide Fischer-Tropsch synthesis: A new path to carbon-neutral fuels," Applied Catalysis B: Environmental 202: 605-610, Mar. 2017, 6 pages.

(56) References Cited

OTHER PUBLICATIONS

Choi et al., "Hydrogenation of carbon dioxide over alumina supported Fe—K catalysts," Catalysis Letters 40: 115-118, Mar. 1996, 4 pages.

Cowie et al., "Naturally occurring radioactive material and naturally occurring mercury assessment of black powder in sales gas pipelines," Radiation Protection and Environment 42: 34-9, Jan.-Mar. & Apr.-Jun. 2019, 6 pages.

Cramer et al., "The Mechanism of Isomerization of Olefins with transition metal catalysts," Journal of the American Chemical Society, 88(15): 3534-3544, Aug. 5, 1966, 11 pages.

Das et al., "Exploring the Promotional Effects of K, Sr, and Mg on the Catalytic Stability of Red Mud for the Synthesis of Glycerol Carbonate from Renewable Glycerol," Industrial & Engineering Chemistry Research, Sep. 2019, 58(35): 15803-15817, 15 pages.

Dinesh et al., "Iron-based flow batteries to store renewable energies," Environmental Chemistry Letters, Feb. 2018, 12 pages.

Ding et al., "CO2 Hydrogenation to Hydrocarbons over Iron-Based Catalyst: Effects of Physico-Chemical Properties of Al2O3 Supports," I&EC Research, Industrial & Engineering Chemistry Research 53(45): 17563-17569, Oct. 2014, 30 pages.

Du et al., "Sodium Hydroxide Production from Seawater Desalination Brine: Process Design and Energy Efficiency," Environmental Science & Technology 52: 5949-5958, 2018, 10 pages.

Fang et al., "A Nanomesoporous Catalyst from Modifier Red Mud and Its Application for Methane Decomposition to Hydrogen Production," Article ID 6947636, Hindawi Publishing Corporation, Journal of Nanomaterials, 2016, 8 pages.

Godoy et al., "210Pb content in natural gas pipeline residues ("black-powder") and its correlation with the chemical composition," Journal of Environmental Radioactivity 83: 101-111, 2005, 12 pages.

Grafe et al., "Bauxite residue issues: IV. Old obstacles and new pathways for in situ residue bioremediation," Hydrometallurgy 108: 46-59, 2011, 14 pages.

Hu et al., "Hydrothermally stable MOFs for CO2 hydrogenation over iron-based catalyst to light olefins," Journal of CO2 Utilization, 15: 89-95, 2016, 7 pages.

Hua et al., "Transformation of 2-Butene into Propene on WO3/MCM-48: Metathesis and Isomerization of n-Butene," Catalysts 8: 585, 2018, 11 pages.

Kan et al., "Trends in electrode development for next generation solid oxide fuel cells," Journal of Materials Chemistry A, 2016, 4(46), 20 pages.

Kumar et al., "Hydrogen production by PEM water electrolysis—A review," Materials Science for Energy Technologies, 2019, 2:442-454, 13 pages.

Kurtoglu and Uzun, "Red Mud as an Efficient, Stable, and Cost-Free Catalyst for Cox-Free Hydrogren Production from Ammonia," Scientific Reports, 6:32279, 2016, 8 pages.

Lee et al., "Selective Positional Isomerization of 2-Butene over Alumina and La-promoted Alumina Catalysts," J. Ind. Eng. Chem. 13(7): 1062-1066, Dec. 2007, 5 pages.

Li et al, "A new iron/vanadium (Fe/V) redox flow battery," Electrical Energy Storage Applications and Technologies (EESAT) 2011, Biennial International Conference, Oct. 16-19, 2011, 169, 4 pages.

Liu et al. "Fe-MOF-derived highly active catalysts for carbon dioxide hydrogenation to valuable hydrocarbons," Journal of CO2 Utilization 21:100-107, Oct. 2017, 8 pages.

Liu et al., "Preparation of Modified Red Mud-Supported Fe Catalysts for Hydrogran Production by Catalytic Methane Decomposition," Article ID 8623463, Hindawi, Journal of Nanomaterials, 2017, 11 pages.

Liu et al., "Pyrolyzing ZIF-8 to N-doped porous carbon facilitated by iron and potassium for CO2 hydrogenation to value-added hydrocarbons," Journal of CO2 Utilization 25: 120-127, May 2018, 8 pages.

Lu et al., "Zeolite-templated nanoporous carbon for high performance supercapacitors," Journal of Materials Chemistry A, 2018, 6:10388, 9 pages.

Luo et al., "Facet Dependence of CO2 Reduction Paths on Cu Electrodes," ACS Catalysis, Nov. 2015, 6:1 (219-229), 36 pages.

Madadkhani, "Red mud as an Ironbased Catalyst for Catalytic Cracking of Naphthalene," a Thesis Submitted in Partial Fulfillment of the Requirement for the Degree of Master of Applied Science in the Faculty of Graduate and Postdoctoral Studies (Chemical and Biological Engineering), The University of British Columbia, Dec. 2016, 192 pages.

Marie et al., "Highly dispersed platinum on carbon aerogels as supported catalysts for PEM fuel cell-electrodes: comparison of two different synthesis paths," Journal of Non-Crystalline Solids, 2004, 350:88-96, 9 pages.

Marie et al., "Highly porous PEM fuel cell cathodes based on low density carbon aerogels as Pt-support: Experimental study of the mass-transport losses," Journal of Power Sources, May 2009, 190(2):423-434, 12 pages.

Marie et al., "Platinum supported on resorcinol-formaldehyde based carbon aerogels for PEMFC electrodes: Influence of the carbon support on electrocatalytic properties," Journal of Applied Electrochemistry, 2007, 37:147-153, 7 pages.

Meng et al., "Modeling of solid oxide electrolysis cell for carbon dioxide electrolysis," Chemical Engineering Journal, 2010, 164: 246-254, 9 pages.

Miao et al., "Revival of Zeolite-Templated Nanocarbon Materials: Recent Advances in Energy Storage and Conversion," Advanced Science, 2020, 7:2001335, 32 pages.

Morrison, "Cis-trans Isomerization of Olefins by Intramolecular Energy Transfer," Journal of the American Chemical Society 87(4): 932, Feb. 1965, 1 page.

Naik et al. "Carbon Dioxide sequestration in cementitious products," Report No. CNU-2009-02, REP-640, Department of Civil Engineering and Mechanics, College of Engineering and Applied Science, University of Wisconsin-Milwaukee, Jan. 2009, 53 pages.

Nam et al., "Catalytic conversion of carbon dioxide into hydrocarbons over iron supported on alkali ion-exchanged Y-zeolite catalysts," Applied Catalysis A: General 179: 155-163, Apr. 1999, 9 pages.

Nam et al., "Catalytic Conversion of Carbon dioxide into hyrdrocarbons over zinc promoted iron catalysts," Energy onvers. Manage. 38: S397-S402, 1997, 6 pages.

Ndlela et al., "Reducibility of Potassium-Promoted Iron Oxide under Hydrogen Conditions," Ind. Eng. Chem. Res. 42: 2112-2121, 2003, 10 pages.

Numpilai et al., "Pore size effects on physicochemical properties of Fe—Co/K—Al2O3 catalysts and their catalytic activity in CO2 hydrogenation to light olefins," Applied Surface Science 483: 581-592, Jul. 2019, 12 pages.

Ogungbemi et al., "Review of operating condition, design parameters and material properties for proton exchange membrane fuel cells," International Journal of Energy Research, Feb. 2021, 45(2):1227-1245, 19 pages.

Ou et al., "A New Reduction Mechanism of CO Dimer by Hydrogenation into C2H4 on Cu(100) Surface: A Theoretical Insight into Kinetics of Elementary Steps," RSC Advances, Oct. 2015, 5:117 (96281), 9 pages.

Pall.com [online], "Cyclo-Filter System," retrieved from URL <https://www.pall.com/en/oil-gas/midstream/midstream-black-powder.html>, retrieved on Jun. 16, 2020, available on or before 2020, 4 pages.

Pavlov et al., "Processes of Synthesis of 1-Butene from 2-Butene by the Positional Isomerization on Sulfocation Exchangers," Russian Journal of Applied Chemistry, 82:6, 2009, 1117-1122, 6 pages.

Ramirez et al., "Metal Organic Framework-Derived Iron Catalysts for the Direct Hydrogenation of CO2 to Short Chain Olefins," ACS Catalysis 8:9174-9182, 2018, 32 pages.

Researchandmarkets.com [online], "Global 1 Butene Demand—Supply and Price Analysis," 2002-2021, retrieved on Jan. 26, 2021, retrieved from URL <https://www.researchandmarkets.com/reports/3752113/global-1-butene-demand-supply-and-price-analysis>, 1 page.

(56) References Cited

OTHER PUBLICATIONS

Russkikh et al. "Turning Waste into Value: Potassium-Promoted Red Mud as an Effective Catalyst for the Hydrogenation of CO2." ChemSusChem 13.11, 2020,2981-2987, 7 pages.

Russkikh et al., "Red mud as an efficient catalyst in turning CO2 hydrogenation," Chemical Science Seminar, retrieved from URL: <https://pse.kaust.edu.sa/events/red-mud-as-an-efficient-catalyst-in-turning-co2-hydrogenationinto-useful-products>, Oct. 13, 2019, Kaust, 2019, 1 page, (abstract only).

Sadakiyo et al., "Electrochemical Production of Glycolic Acid from Oxalic Acid Using a Polymer Electrolyte Alcohol Electrosynthesis Cell Containing a Porous TiO2 Catalyst," Scientific Reports, Dec. 2017, 7:17032.

Sánchez-Díez at al., "Redox flow batteries: Status and perspective towards sustainable stationary energy storage," Journal of Power Sources, 2021, 481:228804, 23 pages.

Shop.pall.com [online], "Black Powder Filter," retrieved from URL <https://shop.pall.com/us/en/search?SearchTerm=black+powder+filter&resetsearch=true>, retrieved on Jun. 16, 2020, available on or before 2020, 7 pages.

Singhal et al., et al., High-temperature Solid Oxide Fuel Cells: Fundamentals, Design and Applications, Elsevier Science, 2003, pp. 7-16.

Stadie et al., "Zeolite-Templated Carbon as an Ordered Microporous Electrode for Aluminum Batteries," ACS Nano 2017, 11:1911-1919, 9 pages.

Sushil et al., "Catalytic applications of red mud, an aluminium industry waste: A review," Applied Catalysis B. Environmental, May 2008, 81(1-2): 64-77, 14 pages.

Thach et al., "Further Improvements in Isomerization of Olefins in Solvent-free conditions," retrieved from URL: <https://WWW.tandfonline.com/doi/abs/10.1080/00397919308011226>, Journal of Synthetic Communications 23:10, Nov. 1992, 1379-1384, 3 pages, (abstract only).

Van Beurden, "On the Catalytic Aspects of Stream-Methane Reforming: A Literature Survey," ECN-I--04-003, retrieved from URL: <https://publicaties.ecn.nl/PdfFetch.aspx?nr=ECN-I--04-003>, Dec. 2004, 27 pages.

Visconti et al., "CO2 Hydrogentation to Lower Olefins on a High Surface Area K-Promoted Bulk Fe-Catalyst," Applied Catalyysis B: Environmental 200:530-542, 2017, 44 pages.

Wahyudi et al., "Utilization of Modified Red Mud as a Heterogeneous Base Catalyst for Transesterification of Canola Oil," Journal of Chemical Engineering of Japan, 50:7, 2017, 561-567, 7 pages.

Wang et al., "Fe—Cu Bimetallic Catalysts for Selective CO2 Hydrogenation to Olefin-rich C2+ Hydrocarbons," I&EC Research, Industrial & Engineering Chemistry Research 57(13): 4535-4542, Feb. 2018, 37 pages.

Wang et al., "Hydrogen production by catalytic dehydrogenation of tetralin and decalin over stacked cone carbon nanotube-supported Pt catalysts," Energy & Fuels 2006, 20:2612-2615, 4 pages.

Wang et. al., "Pure hydrogen production by partial dehydrogenation of cyclohexane and methylcyclohexane over nanotube-supported Pt and Pd catalysts," Energy & Fuels, 2004, 18:1429-1433, 5 pages.

Wei et al., "New insights into the effect of sodium on Fe3O4-based nanocatalysts for CO2 hydrogenation to light olefins," Catalysis Science & Technology 6(13): 4786-4793, 2016, 8 pages.

wikipedia.com [online], "Solid oxide electrolyzer cells," available on or before Aug. 6, 2020 via Internet Archive Wayback Machine URL<https://web.archive.org/web/20200806055040/https://en.wikipedia.org/wiki/Solid_oxide_electrolyzer_cell>, retrieved on Nov. 11, 2021, retrieved from URL <https://en.wikipedia.org/wiki/Solid_oxide_electrolyzer_cell>, 7 pages.

Yensen et al., "Open source all-iron battery for renewable energy storage," HardwareX 6: e00072, 2019, 11 pages.

You et al., "Hydrogenation of carbon dioxide to light olefins over non-supported iron catalyst," Chinese Journal of Catalysis 34(5): 956-963, May 2013, 8 pages.

* cited by examiner

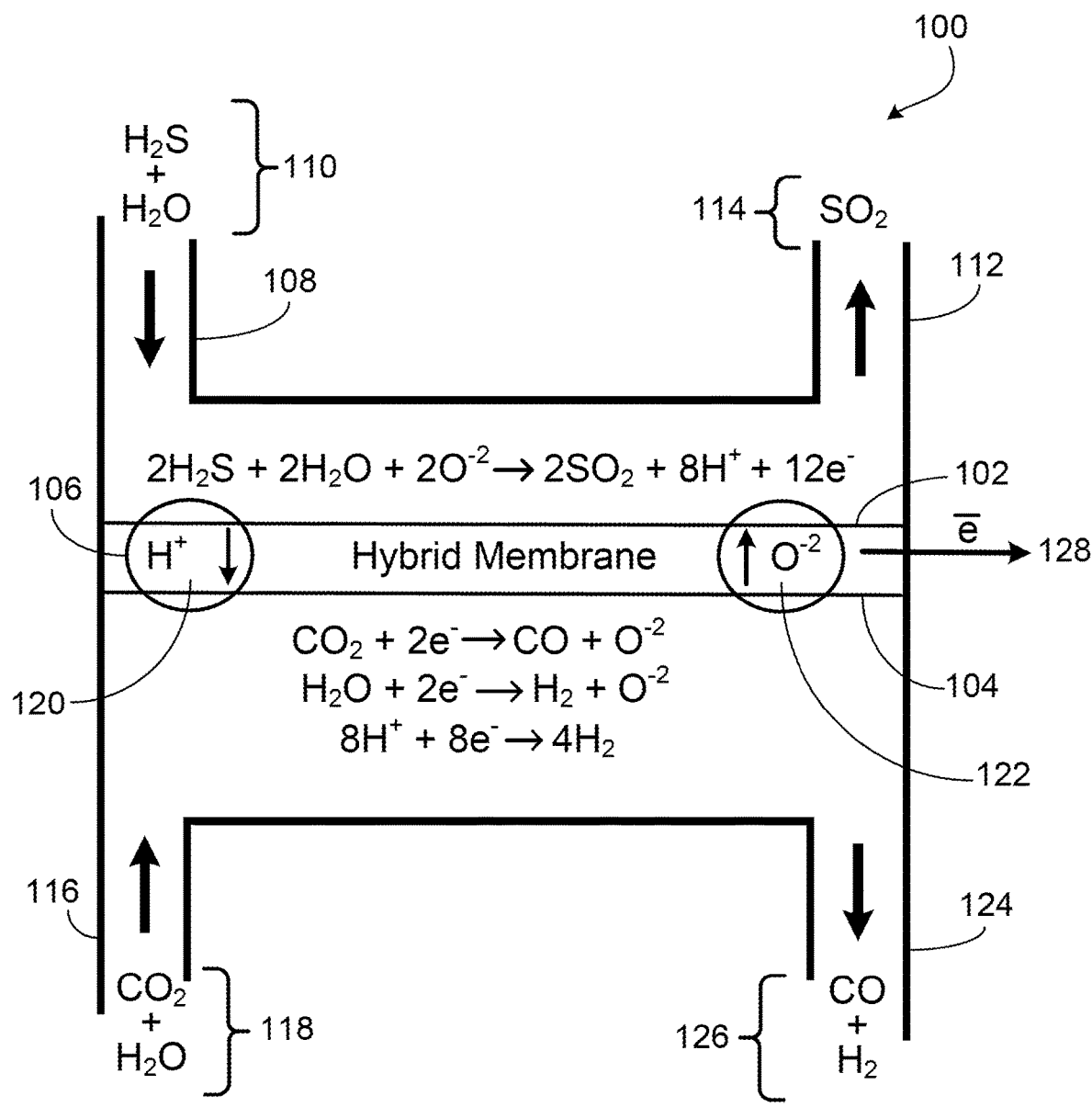

METHODS FOR PRODUCING SYNGAS FROM $H_2S$ AND $CO_2$ IN AN ELECTROCHEMICAL CELL

TECHNICAL FIELD

This disclosure relates to a combination of solid oxide fuel cell and an electrolysis cell to produce valuable commercial products from industrial waste gases. In particular, the disclosure relates to effectively reacting $H_2S$ and $CO_2$ in an electrochemical cell to produce $SO_2$, syngas, and/or an electric current.

BACKGROUND

With the rising concerns of increasing $CO_2$ emissions and the resultant global warming and related climate changes, governments and companies around the world are looking for ways to reduce their energy intensity and carbon footprint. One way to reduce $CO_2$ emissions is to use renewable energy sources, such as solar, wind, and geothermal energy sources. However, despite decreasing costs of "green" energy from renewable sources, the amount of energy generated from all such sources combined is insufficient to satisfy the growing global demand for energy, and the anthropogenic $CO_2$ emissions continue to rise, adding billions of tons of $CO_2$ to the atmosphere every year. In addition, various industrial processes, petrochemical industry in particular, produce billions of tons of $H_2S$. Each year the U.S. alone produces tens to millions of tons of $H_2S$, mainly as a by-product obtained during refining of fossil fuels. Due to lack of commercially viable use for the $H_2S$ itself, nearly all of it is converted to elemental sulfur in the Claus process, and the elemental sulfur is then stored in open fields as a waste. Economically efficient utilization of either or both of $CO_2$ and $H_2S$ is a formidable challenge.

SUMMARY

The present disclosure is based, at least in part, on a realization that using an electrochemical cell including an anode, a cathode, and a hybrid electrolyte membrane, the waste gases $CO_2$ and $H_2S$ can be converted to valuable products. In particular, the disclosure is based on integrating (i) a solid oxide fuel cell ("SOFC"), where the chemical energy of a fuel ($H_2S$) is converted into electrical energy and a valuable side-product $SO_2$ is produced, and (ii) an electrolysis cell, where the electricity generated by SOFC is used for electrolysis of $CO_2$ and $H_2O$ to yield synthesis gas, which is a mixture of CO and $H_2$.

In one general aspect, the present disclosure provides a method for producing syngas (CO and $H_2$) and $SO_2$ from $H_2S$, $CO_2$, and $H_2O$ in an electrochemical cell containing an anode, a cathode, and a conductive membrane positioned between and in electrochemical contact with the anode and the cathode, the method including the following steps:
  contacting the anode of the electrochemical cell with a stream containing mainly $H_2S$ and $H_2O$ to produce a stream containing mainly $SO_2$; and
  contacting the cathode of the electrochemical cell with a stream containing mainly $CO_2$ and $H_2O$ to produce a stream containing mainly syngas.
In some embodiments, the method includes contacting the anode and contacting the cathode occur simultaneously.

In some embodiments, the method further includes collecting the stream comprising $SO_2$ from the anode side of the electrochemical cell.

In some embodiments, the method further includes collecting the stream comprising the syngas from the cathode side of the electrochemical cell.

In some embodiments, the stream comprising $H_2S$ and $H_2O$ is a gas.

In some embodiments, the pressure of the stream is from about 1 bar to about 20 bar.

In some embodiments, the temperature of the stream is from about 100° C. to about 1,500° C.

In some embodiments, molar ratio of $H_2S$ to $H_2O$ in the stream is from about 0.1:1 to about 10:1.

In some embodiments, temperature of the stream is from about 700° C. to about 1,000° C.

In some embodiments, the anode material comprises $WS_2$, $CoS_{1.035}$ or $Li_2S$.

In some embodiments, the stream comprising $CO_2$ and $H_2O$ is a gas.

In some embodiments, the pressure of the stream is from about 1 bar to about 20 bar.

In some embodiments, the temperature of the stream is from about 100° C. to about 1,500° C.

In some embodiments, molar ratio of $CO_2$ to $H_2O$ in the stream is from about 0.1:1 to about 10:1.

In some embodiments, temperature of the stream is from about 700° C. to about 1,000° C.

In some embodiments, the cathode material comprises a perovskite material of the general type $La_{1-x}Sr_xCr_{1-y}M_yO_3$, where M is a metal selected from Mn, Fe, Co, and Ni.

In some embodiments, the conductive membrane comprises a material selected from yttria-stabilized zirconia (YSZ), scandia stabilized zirconia (ScSZ), gadolinium doped ceria (GDC), lanthanum strontium cobalt ferrite (LSCF), Sr-doped La manganites (LSM), and ferrites-nickelates (LSFN).

In some embodiments, molar ratio of $H_2S$ to $CO_2$ in the electrochemical cell is from about 0.1:1 to about 10:1.

In some embodiments, molar ratio of CO to $H_2$ in the syngas is from about 1:1 to about 1:5.

In some embodiments, the syngas comprises no more than from about 0.5 wt. % to about 10 wt. % of $CO_2$ or $H_2O$, or a combination thereof.

Unless otherwise defined, all technical and scientific terms used herein have the same meaning as commonly understood by one of ordinary skill in the art to which the present application belongs. Methods and materials are described herein for use in the present application; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the present application will be apparent from the following detailed description and FIGURES, and from the claims.

DESCRIPTION OF DRAWINGS

FIG. 1 is a schematic description of the electrochemical process of producing $SO_2$, CO, and $H_2$ from $H_2S$, $CO_2$, and $H_2O$.

DETAILED DESCRIPTION

Generally, the present disclosure related to systems, apparatuses, and methods to effectively react waste gases $CO_2$ and $H_2S$, in the presence of $H_2O$, to produce syngas (a mixture of mainly CO and $H_2$), $SO_2$, and a direct electric current, all of which are valuable industrial products. In one aspect, the disclosure provides an electrochemical cell, which includes an anode, a cathode, and a conductive membrane positioned between and in electrochemical contact with the anode and the cathode. The disclosure further provides a method of using said electrochemical cell to produce $SO_2$, syngas, extra $H_2$, and an electric current, from $CO_2$, $H_2S$, and $H_2O$. Certain embodiments of the aforementioned electrochemical cell and methods are described herein.

FIG. 1 schematically shows the electrochemical cell and the process within the present claims. Referring to FIG. 1, the electrochemical cell 100 includes an anode 102, a cathode 104, and a conductive hybrid membrane 106. The cell 100 also includes a "fuel" stream feed channel 108 through which the fuel stream consisting mainly of $H_2S$ and $H_2O$ may be supplied to the anode 102 side. Simultaneously, a feed stream 118 of an "oxidizer" consisting mainly of $CO_2$ and $H_2O$ may be supplied to the cathode 104 side of the cell through the oxidizer feed channel 116. Upon contacting the anode, $H_2S$ and water in the fuel feed stream undergo the following oxidation reaction:

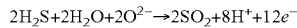

$$2H_2S+2H_2O+2O^{2-} \rightarrow 2SO_2+8H^++12e^-$$

In essence, the oxygen ions $O^{2-}$ that have migrated to the surface of the anode 102 from the cathode 104 through the membrane 106 (see 122 in FIG. 1) oxidize the fuel to produce $SO_2$, hydrogen ions $H^+$, as well as the electric current (a number of $e^-$). The stream of gaseous $SO_2$ 114 being produced in this reaction can be harvested from the anode 102 side of the cell 100 through the outlet channel 114. In the meantime, the $H^+$ produced in the oxidation reaction migrate through the conductive membrane 106 from the anode 102 to the cathode 104 side of the cell 100 (see 120 in FIG. 1). The electric current that is produced in the oxidation reaction also flows through the electrically conductive hybrid membrane from anode 102 to cathode 104 (flow of elections not shown). At the cathode 104 side of the membrane, $CO_2$ and water supplied through 116, along with the $H^+$ ions that migrated from the anode side (see 120), and with the aid of the electric current produced on the anode 102 side, undergo the following cascade of reduction reactions:

$$CO_2+2e^- \rightarrow CO+O^{2-} \quad (1)$$

$$H_2O+2e^- \rightarrow H_2+O^{2-} \quad (2)$$

$$8H^++8e^- \rightarrow 4H_2 \quad (3)$$

In essence, the $CO_2$ and the $H_2O$ are electrolyzed by the electric current to produce syngas, a gaseous mixture of CO and $H_2$. The oxygen anions $O^{2-}$ that are produced in reactions (1) and (2) become the oxidizing reagent when those anions migrate to the anode 102 side (see 122). The $H^+$ cations are also reduced by the electric current to supply an additional amount of molecular gaseous $H_2$ to the syngas mixture. The syngas 126, including the extra $H_2$, can be collected rom the cathode side of the cell 100 through the outlet channel 124. In addition, the electric current produced on the anode side, depending on the flow rates of streams 110 and 118, instead of reducing $CO_2$ and $H_2O$ to produce syngas, can be diverted in 128 and supplied to a local utility grid (the electric current 128 is DC, and may be converted to AC before being supplied to the users of electricity).

Accordingly, the present disclosure provides a method of reacting $H_2S$ and $CO_2$, a method of co-processing $H_2S$ and $CO_2$, or a method of producing syngas (CO and $H_2$) and $SO_2$ from $H_2S$, $CO_2$, and $H_2O$. The method generally includes an electrochemical cell containing an anode, a cathode, and a conductive membrane positioned between and in electrochemical contact with the anode and the cathode. The method further includes contacting the anode of the electrochemical cell with a stream consisting mainly of $H_2S$ and $H_2O$. In one example, this contacting leads to producing a stream consisting mainly of $SO_2$ on the anode side of the electrochemical cell. The method may further include collecting (e.g., harvesting) the stream of $SO_2$ for further use. Additionally, the method further includes contacting the cathode of the electrochemical cell with a stream consisting mainly of $CO_2$ and $H_2O$ to produce a stream containing mainly syngas (CO and $H_2$). The method may also include collecting (e.g., harvesting) the stream of syngas for further use. In some embodiments, contacting the anode with $H_2S$ and contacting the cathode with $CO_2$ occur simultaneously.

The anode side of the electrochemical cell is generally operated in a manner applicable to operation of a fuel cell, for example, a solid oxide fuel cell ("SOFC"). In this arrangement, the $H_2S$ is oxidized at the anode to produce electric current, where the electricity in the form of a direct current of electrons is moving through the electrically conductive electrolyte of the conductive hybrid membrane (as discussed above with reference to FIG. 1).

Generally, the anode is made of a solid electrolyte material and is either in direct contact with the electrolyte of the hybrid membrane, or is connected to the conductive membrane material through an interconnect layer, such as a metallic or ceramic layer. Suitable examples of anode materials include pure metals, metal sulfides, metal oxides, yttria-stabilized zirconia (YSZ), or any combination thereof. Suitable examples of metal sulfides include thiospinels, such as $WS_2$, $CoS_{1.035}$ or $Li_2S$. Suitable examples of metal oxides include $LiCoO_2$, $V_2O_5$, NiO, $LaSrMnO_6$, $CeO_2$, $Y_2O_3$, $La_2O_3$, MgO, and $TiO_2$. Other suitable anode materials include metallic Ru, Cu, Co, Ni, Pt, or Ag, or any combination thereof. Other examples of anode materials include perovskite and chromite ($La_{0.8}Sr_{0.2}Cr_{0.5}Mn_{0.5}O_3$). Any anode material generally known to be useful in SOFC operation may be used in the electrochemical cell of this disclosure. Anode layers in the cells of this disclosure may be of various thickness ranging from about 1 nm to about 1 cm, or more, depending on the needs, the scale, and the output of the process.

The stream containing $H_2S$ and $H_2O$ can generally be a liquid phase or a gas phase. When the stream is a liquid, an aqueous solution of $H_2S$ in water, the concentration of $H_2S$ may be from about 0.01M to about 1M. In one example, the stream is a saturated solution of $H_2S$ in water at the operating temperature. When the stream is a gas, it may be applied to the anode side of the electrochemical cell at a pressure from about 1 bar to about 20 bar, from about 1 bar to about 15 bar, from about 1 bar to about 10 bar, or from about 1 bar to about 5 bar. In some embodiments, the pressure of the gaseous stream containing $H_2S$ and $H_2O$ is about 1 bar, about 2 bar, about 3 bar, about 5 bar, or about 10 bar. The temperature of the $H_2S$ stream is generally a high operating temperature. For example, the operating temperature on the anode side of the cell may be from about 100° C. to about 1,500° C., from about 200° C. to about 1,200° C., from about 400° C. to about 1,100° C., from about 500° C. to about 1,200, or from about 700° C. to about 1,000° C. Any suitable molar ratio of $H_2S$ to $H_2O$ may be used in this fuel stream. In some embodiments, molar ratio of $H_2S$ to $H_2O$ in the fuel stream is about 0.1:1, about 0.5:1, about 1:1, about 1:2, about 1:5, or about 1:10.

Generally, the cathode in the electrochemical cell is made of a solid electrolyte material and is either in direct contact with the electrolyte of the hybrid membrane, or is connected to the membrane material through an interconnect layer, such as a metallic or ceramic layer. Suitable examples of cathode materials include lanthanum strontium manganite ("LSM"), conductive ceramics, or perovskite. In one example, the cathode material is a perovskite material of the general type $La_{1-x}Sr_xCr_{1-y}M_yO_3$, where M is a metal selected from Mn, Fe, Co, and Ni. Any cathode material generally known to be useful in $CO_2$ electrolysis (including high-temperature electrolysis) maybe used in the electrochemical cell of this disclosure. Cathode layers in the cells of this disclosure may be of various thickness ranging from about 1 nm to about 1 cm, or more, depending on the needs, the scale, and the output of the process. The cathode material may be selected to operate at high temperatures, for example, from about 500° C. to about 1,500° C., or from about 800° C. to about 1,200° C.

The stream containing $CO_2$ and $H_2O$ can generally be a liquid phase or a gas phase. When the stream is a liquid, an aqueous solution of $CO_2$ in water, the concentration of $CO_2$ may be from about 0.01M to about 1M. In one example, the stream is a saturated solution of $CO_2$ in water at the operating temperature. When the stream is a gas, it may be applied to the cathode side of the electrochemical cell at a pressure from about 1 bar to about 20 bar, from about 1 bar to about 15 bar, from about 1 bar to about 10 bar, or from about 1 bar to about 5 bar. In some embodiments, the pressure of the gaseous stream containing $CO_2$ and $H_2O$ is about 1 bar, about 2 bar, about 3 bar, about 5 bar, or about 10 bar. The temperature of the $CO_2$ stream is generally a high operating temperature. For example, the operating temperature on the cathode side of the cell may be from about 100° C. to about 1,500° C., from about 200° C. to about 1,200° C., from about 400° C. to about 1,100° C., from about 500° C. to about 1,200, or from about 700° C. to about 1,000° C. Any suitable molar ratio of $CO_2$ to $H_2O$ may be used in this oxidizer stream. In some embodiments, molar ratio of $CO_2$ to $H_2O$ in the oxidizer stream is about 0.1:1, about 0.5:1, about 1:1, about 1:2, about 1:5, or about 1:10.

In a general aspect, the electrochemical cell of this disclosure contains a hybrid conductive membrane between the anode and the cathode. The membrane is hybrid in that it is both ion-conductive and electrically conductive. For example, the ion-conductive membrane may allow a simultaneous free flow of hydrogen cation ($H^+$), oxygen anion ($O^{2-}$), as well as the other ions between the anode and the cathode (as discussed for FIG. 1 discussed above). At the same time, the membrane is electrically conductive, allowing a direct electric current (unidirectional flow of electrons) from the anode to the cathode through the membrane. The membrane may be water-permeable, partially water-permeable, or water-impermeable. In one example, the conductive membrane may be a single layer. In another example, the conductive membrane may have a multilayered structure, where each layer contains a different conductive material. The membrane may contain, for example, a layer of a liquid electrolyte, such as a NaCl solution, in between the two layers of solid electrolytes. The membrane may also have a segmented structure, where each of the segments is selectively conductive for one ion. In one example, the membrane may contain two segments: a segment selectively conductive for $H^+$ and a segment selectively conductive for $O^{2-}$, where each segment is made from an electrically conductive material. In another example, the membrane may contain three separate segments: s segment selectively conductive for $H^+$, a segment selectively conductive for $O^{2-}$, and an electrically conductive segment (allowing flow of $e^-$ from anode to cathode) which is not conductive to $H^+$ and $O^{2-}$. Examples of mixed solid ion conductive electrolytes of the hybrid membrane include a dense layer of ceramic capable or conducting oxygen ions, yttria-stabilized zirconia (YSZ), scandia stabilized zirconia (ScSZ) (e.g., about 9 mol,% $Sc_2O_3$—9ScSZ), gadolinium doped ceria (GDC), lanthanum strontium cobalt ferrite (LSCF), Sr-doped La manganites (LSM), and ferrites-nickelates (LSFN). Some examples of hybrid materials include CaO, ZrO, and TiO, and combinations thereof. Other examples include $BaZr_{0.4}Ce_{0.4}Y_{0.1}Yb_{0.1}$ (BZCYYb—4411), $BaZr_{0.4}Ce_{0.4}Y_{0.1}Yb_{0.103-d}$, and $BaZr_{0.1}Ce_{0.7}Y_{0.1}Yb_{0.1}$ (BZCYYb1711), or a combination thereof. The membrane material may be chosen to withstand the high temperature operating conditions from about 700° C. to about 1,000° C. In some embodiments, electric conductivity of the hybrid membrane is from about $10^{-1}$ S/m to about $10^8$ S/m (Siemens per meter). For example, electric conductivity of the hybrid membrane at the operating conditions (such as high temperature) is about $10^2$ S/m, about $10^4$ S/m, about $10^6$ S/m, or about $10^7$ S/m.

In some embodiments, molar ratio of $H_2S$ to $CO_2$ in the electrochemical cell is from about 0.1:1 to about 10:1. For example, the molar ratio of $H_2S$ to $CO_2$ is about 1:10, about 1:2, about 1:1, about 1:2, about 1:5, or about 1:10. In some embodiments, the flow of $H_2S$ to anode and the flow of $CO_2$ to cathode may be selected such that instead of a syngas, an electric current is produced and harvested to a local utility grid. In one example, the electric current produced from the electrochemical cell is from about 50 W to about 100 MW. In another example, the electric current produced in the cell is from about 1 A to about 1,000 A, or from about 1 A to about 100 A. In yet another example, the electric current is from about 1 V to about 300 V, or from about 50 V to about 250 V.

In some embodiments, the stream containing $SO_2$ collected from the anode side of the electrochemical cell is substantially pure. In one example, the stream comprises no more than from about 0.5 wt. % to about 10 wt. % of $H_2S$ or $H_2O$, or a combination thereof. In some embodiments, the stream containing $SO_2$ contains about 80 wt. %, about 85 wt. %, about 90 wt. %, about 95 wt. %, or about 99 wt. % of $SO_2$.

In some embodiments, molar ratio of CO to $H_2$ in the stream containing syngas is from about 1:10 to about 10:1, from about 1:10 to about 5:1, or from about 1:5 to about 1:1. In some embodiments, molar ratio of CO to $H_2$ is about 1:10, about 1:5, about 1:2, about 1:1, about 2:1, about 5:1, or about 10:1. In one example, the syngas is collected from the cathode side of the cell at a temperature insufficient to react CO and $H_2$ to produce any other chemical compound. In some embodiments, the syngas is substantially free of components other than CO and $H_2$. For example, the syngas contains no more than about 0.5 wt. %, about 1 wt. %, about 2 wt. %, about 5 wt. %, or about 10 wt. % of $H_2O$ or $CO_2$, or a combination thereof.

The syngas produced according to the methods of this disclosure may be used in any field where syngas is generally useful. For example, the syngas can be burned (reacted with $O_2$ at elevated temperature) to produce lighting (commonly known as gas lighting), or it may be used as fuel for cooking and heating. In another example, syngas may be used to produce sponge iron by reduction of iron ore. Syngas can also be useful to produce diesel in Fischer-Tropsch process, or it may be chemically converted to other useful chemicals, such as methane, methanol, or dimethyl ester.

Likewise, $SO_2$ produced using the methods of this disclosure may be useful in any manner where this compound is generally useful. In one example, $SO_2$ may be used to react with $H_2S$ to produce elemental sulfur (Claus process). $SO_2$ may also be reacted with $Cl_2$ to yield sulfuryl chloride ($SO_2Cl_2$). Importantly, $SO_2$ may be oxidized by oxygen in the presence of water to produce sulfuric acid ($H_2SO_4$). Various S-containing heterocyclic reagents may also be prepared from $SO_2$ for pharmaceutical industry, sulfolane being one of the examples.

Other Embodiments

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following claims.

What is claimed is:

1. A method for producing syngas and $SO_2$ from $H_2S$, $CO_2$, and $H_2O$ in an electrochemical cell comprising an anode, a cathode, and a conductive membrane positioned between and in electrochemical contact with the anode and the cathode, the method comprising:
   contacting the anode of the electrochemical cell with a stream comprising $H_2S$ and $H_2O$ to produce a stream comprising $SO_2$; and
   contacting the cathode of the electrochemical cell with a stream comprising $CO_2$ and $H_2O$ to produce a stream comprising syngas.

2. The method of claim 1, wherein contacting the anode and contacting the cathode occur simultaneously.

3. The method of claim 1, further comprising collecting the stream comprising $SO_2$ from the anode side of the electrochemical cell.

4. The method of claim 1, further comprising collecting the stream comprising the syngas from the cathode side of the electrochemical cell.

5. The method of claim 1, wherein the stream comprising $H_2S$ and $H_2O$ is a gas.

6. The method of claim 5, wherein the pressure of the stream is from about 1 bar to about 20 bar.

7. The method of claim 5, wherein the temperature of the stream is from about 100° C. to about 1,500° C.

8. The method of claim 5, wherein molar ratio of $H_2S$ to $H_2O$ in the stream is from about 0.1:1 to about 10:1.

9. The method of claim 5, wherein temperature of the stream is from about 700° C. to about 1,000° C.

10. The method of claim 1, wherein the anode material comprises $WS_2$, $CoS_{1.035}$ or $Li_2S$.

11. The method of claim 1, wherein the stream comprising $CO_2$ and $H_2O$ is a gas.

12. The method of claim 11, wherein the pressure of the stream is from about 1 bar to about 20 bar.

13. The method of claim 11, wherein the temperature of the stream is from about 100° C. to about 1,500° C.

14. The method of claim 11, wherein molar ratio of $CO_2$ to $H_2O$ in the stream is from about 0.1:1 to about 10:1.

15. The method of claim 11, wherein temperature of the stream is from about 700° C. to about 1,000° C.

16. The method of claim 1, wherein the cathode material comprises a perovskite material of the general type $La_{1-x}Sr_xCr_{1-y}M_yO_3$, where M is a metal selected from Mn, Fe, Co, and Ni.

17. The method of claim 1, wherein the conductive membrane comprises a material selected from yttria-stabilized zirconia (YSZ), scandia stabilized zirconia (ScSZ), gadolinium doped ceria (GDC), lanthanum strontium cobalt ferrite (LSCF), Sr-doped La manganites (LSM), and ferrites-nickelates (LSFN).

18. The method of claim 1, wherein molar ratio of $H_2S$ to $CO_2$ in the electrochemical cell is from about 0.1:1 to about 10:1.

19. The method of claim 1, wherein molar ratio of CO to $H_2$ in the syngas is from about 1:1 to about 1:5.

20. The method of claim 1, wherein the syngas comprises no more than from about 0.5 wt. % to about 10 wt. % of $CO_2$ or $H_2O$, or a combination thereof.

* * * * *